United States Patent
Brady et al.

(10) Patent No.: US 8,812,271 B1
(45) Date of Patent: Aug. 19, 2014

(54) WATERFLOODING INJECTATE DESIGN SYSTEMS AND METHODS

(75) Inventors: Patrick V. Brady, Albuquerque, NM (US); James L. Krumhansl, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 455 days.

(21) Appl. No.: 13/226,276

(22) Filed: Sep. 6, 2011

(51) Int. Cl.
*G06F 17/50* (2006.01)

(52) U.S. Cl.
USPC .................................................. 703/1

(58) Field of Classification Search
CPC .. E21B 41/582; E21B 43/295; B01F 13/0059
USPC .......................................................... 703/10
See application file for complete search history.

(56) References Cited

U.S. PATENT DOCUMENTS

| | | | |
|---|---|---|---|
| 2001/0045279 A1* | 11/2001 | Converse et al. | 166/246 |
| 2005/0115649 A1* | 6/2005 | Tokarz et al. | 148/648 |
| 2006/0223159 A1* | 10/2006 | Pfeiffer et al. | 435/252.1 |
| 2010/0081184 A1* | 4/2010 | Downey et al. | 435/167 |
| 2010/0185393 A1* | 7/2010 | Liang et al. | 702/7 |

FOREIGN PATENT DOCUMENTS

| WO | WO2008/029124 | 3/2008 |
|---|---|---|
| WO | WO2008/029131 | 3/2008 |

OTHER PUBLICATIONS

Lingli Wei, "Rigorous Water Chemistry Modelling in Reservoir Simulations for Waterflood and EOR Studies" SPE 138037, 2010, pp. 1-17.*

Angove, M., et al. (1998). "The influence of temperature on the adsorption of cadmium(II) and cobalt(II) on kaolinite." Journal of Colloid and Interface Science 204: 93-103.

Austad, T., et al: (2010). "Chemical mechanism of low salinity water flooding in sandstone (SPE 129767)." SPE Improved Oil Recovery Symposium: 1-17.

Brady, P. V. (1994). "Alumina surface chemistry at 25, 40 and 60° C." Geochimica et Cosmochimica Acta 58: 1213-1217.

Brady, P. V., et al. (1996). "Molecular Controls on Kaolinite Surface Charge." Journal of Colloid and Interface Sciences 183: 356-364.

Buckley, J. S. (1994). Chemistry of the Crude Oil/Brine Interface. Proceedings of the 3rd International Symposium on Evaluation of Reservoir Wettability and its Effect on Oil Recovery, Laramie, WY.

Buckley, J. S., et al. (1989). "Influence of electrical surface charges on the wetting properties of crude oil." SPE Reservoir Engineering 4: 332-340.

(Continued)

*Primary Examiner* — Dwin M Craig
(74) *Attorney, Agent, or Firm* — Daniel J. Jenkins

(57) ABSTRACT

A method of designing an injectate to be used in a waterflooding operation is disclosed. One aspect includes specifying data representative of chemical characteristics of a liquid hydrocarbon, a connate, and a reservoir rock, of a subterranean reservoir. Charged species at an interface of the liquid hydrocarbon are determined based on the specified data by evaluating at least one chemical reaction. Charged species at an interface of the reservoir rock are determined based on the specified data by evaluating at least one chemical reaction. An extent of surface complexation between the charged species at the interfaces of the liquid hydrocarbon and the reservoir rock is determined by evaluating at least one surface complexation reaction. The injectate is designed and is operable to decrease the extent of surface complexation between the charged species at interfaces of the liquid hydrocarbon and the reservoir rock. Other methods, apparatus, and systems are disclosed.

18 Claims, 10 Drawing Sheets

(56) References Cited

OTHER PUBLICATIONS

Chow, R. S., et al. (1988). "Electrophoretic mobilities of bitumen and conventional crude-in-water emulsions using the laser Doppler apparatus in the presence of multivalent cations." J. Coll. Interf. Science 125: 212-225.

Clarke, C. D., et al. (1972). "Influence of pH on the adsorption of benzoic acid by kaolin." The Pharmaceutical Journal(Jul. 8, 1972).

Dubey, S. T., et al. (1993). "Base number and wetting properties of crude oils." SPE Reservoir Engineering August: 195-199.

Gan, H., et al. (1992). "Reduction of Structural Iron in Ferruginous Smectite by Free Radicals." Clays and Clay Minerals 40(6): 659-665.

Gan, W., et al. (2008). "Coagulation of bitumen with kaolinite in aqueous solutions containing Ca2+, Mg2+, and Fe3+." Journal of Colloid and Interface Science 324: 85-91.

Lager, A., et al. (2006). Low salinity oil recovery—an experimental investigation; SCA2006-36.

Liu, J. J., et al. (2004). "Role of fine clays in bitumen extraction from oil sands." Materials, Interfaces, and Electrochemical Phenomena 50: 1917-1927.

Machesky, M. L. (1990). Influence of Temperature on Ion Adsorption by Hydrous Metal Oxides. Chemical Modeling in Aqueous Systems II—ACS Symp. Series #416. D. C. Melchior and R. L. Bassett. Washington, D. C. ACS: 262-274.

Machesky, M. L., et al. (1991). "Titration calorimetry of aqueous alumina suspensions, Part II. Discussion of enthalpy changes with pH and ionic strength." Colloids and Surf. 53: 315-328.

Madland, M. V., et al., "Chemical Alterations Induced by Rock—Fluid Interactions When Injecting Brines in High Porosity Chalks", *Transp Porous Med* (2011) 87, (Jan. 8, 2011), 679-702.

Morrow, N. R., et al. (2011). "Improved oil recovery by low-salinity waterflooding." J. Petroleum Technology May 2011(106-110).

Parkhurst, D. L., et al. (1999). User's guide to PHREEQC (Version 2)—A computer program for speciation, batch-reaction, one-dimensional transport, and inverse geochemical calculations. U.S. Geological Survey.

Perrin, D. D. (1964). "The effect of temperature on pK values of organic bases." Australian J. of Chemistry 17: 484-488.

Rao, S. M., et al. (1984). "Mechanism of Sulfate Adsorption by Kaolinite." Clays and Clay Minerals 32(5): 414-418.

Takamura, K. and R. S. Chow (1985). "The electric properties of the bitumen/water interface." Colloids and Surfaces 15: 35-48.

Thompson, Dudley, et al., "Surface Eletrical Properties of Calcite", *School oif Chemistry, University of Bristol, Bristol BS8 1Ts, England and Central Labratories*, Journal of Colloid and Interface Science, vol. 131, No. 1, (Aug. 1989), 74-82.

Van Cappellen, Philippe, "A Surface complexation model of the carbonate mineral-aqueos solution interface", *Geochima et Cosmochimica Acta* vol. 57, (1993), 3505-3518.

Villegas-Jimenez, A., A. Mucci, et al. (2009). "Defining reactive sites on hydrated mineral surfaces: Rhombohedral carbonate minerals." Geochem. Cosmochim. Acta. 73: 4326-4345.

Ward, D. B. and P. V. Brady (1998). "Organic acids, Al, and Kaolinite Surfaces." Clays and Clay Minerals 46: 453-465.

Yucca Mountain Repository Program (2006). Thermodynamic Data Base data0.ymp.R5d.

Zachara, J. M., C. E. Cowan, et al. (1988). "Chromate Adsorption by Kaolinite." Clays and Clay Minerals 36(4): 317-326.

Zhou, Z. A., X. Zhenghe, et al. (1999). "Coagulation of bitumen with fine silica in model systems." Colloids and Surfaces 148: 199-211.

\* cited by examiner

WATERFLOODING INJECTATE DESIGN SYSTEMS AND METHODS

STATEMENT OF GOVERNMENT RIGHTS

This invention was developed under Contract DE-AC04-94AL85000 between Sandia Corporation and the U.S. Department of Energy. The U.S. Government has certain rights in this invention.

BACKGROUND

1. Field

Embodiments of the invention relate generally to recovering liquid hydrocarbons from subterranean reservoir with an injectate, and more particularly to methods and systems to design the injectate to reduce surface complexation between interfaces of the liquid hydrocarbon and reservoir rock.

2. Background Information

Oil, petroleum, tars, other liquid fossil fuels, and other liquid hydrocarbons are contained in, and recovered from, subterranean or underground formations. To access these liquid hydrocarbons, wells are typically drilled from the surface down into the subterranean formations, and the liquid hydrocarbons are recovered through the wells:

Initially, the liquid hydrocarbons may be recovered through primary extraction. Primary extraction may use natural reservoir pressure to force the liquid hydrocarbons into the well. However, typically not all of the liquid hydrocarbons may be recovered through primary extraction. At some point, residual liquid hydrocarbons may be held too tightly within the subterranean formation (e.g., due to adhesive interactions between the oil and the rock) and may be unrecoverable or practically unrecoverable through primary extraction. Often the amount of remaining liquid hydrocarbons may be significant, for example around half of the original oil or other liquid hydrocarbons.

Secondary extraction is commonly used in order to recover some of the remaining liquid hydrocarbons. A common form of secondary extraction involves injecting a medium known as an injectate, such as water (e.g., seawater or terrestrial water) or gas (e.g., carbon dioxide), into the subterranean reservoir in order to mobilize and recover additional liquid hydrocarbons.

FIG. 1 is cross-sectional side view illustrating an example of a prior art waterflooding procedure. An injection well 101 resides on a surface 102 of the earth 100. An injection wellbore 103 extends from the injection well 101 into a subterranean formation 104. The subterranean formation may be, for example, sedimentary rock (e.g., sandstone, siltstone, etc.), carbonate (e.g., limestone, dolomite, etc.) or another portion of the earth having oil, petroleum, tars, other liquid fossil fuels, or other liquid carbonaceous fuels or hydrocarbons, contained within pores or openings thereof.

During a waterflooding procedure, waterflooding equipment 105 may be used to pump, inject, or otherwise introduce liquid injectate 106 (e.g., seawater or terrestrial water) under pressure through the injection well 101 into the injection wellbore 103 and down into the subterranean formation 104. Without limitation, the waterflooding equipment 105 may include a high pressure pump, storage tanks, storage trucks, piping, etc. The injectate 106 may mobilize and drive a portion of the remaining liquid hydrocarbons toward the production well 109. An injectate/hydrocarbon mixture 107 (also including some aqueous connate fluid natively present in the subterranean formation along with the hydrocarbon) may be recovered through a production wellbore 108 and the production well 109.

Traditionally, the liquid injectate used for waterflooding has typically been substantially unmodified seawater or terrestrial water (e.g., from lakes, streams, or wells), which is available at the site of the injection well 101. More recently, there have been reports that, under certain circumstances, the salinity of the injectate 106 used in the waterflooding operation affects the performance of the waterflooding operation (e.g., the amount of additional oil recovered). In particular, it has been reported that, under certain circumstances, low salinity injectate or so-called "low-sal" water flooding operations may increase the level of hydrocarbon recovery as compared to the use of higher salinity injectate.

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

Disclosed herein are new and useful methods, apparatus, systems, and means to design an injectate for a waterflooding operation that is operable to reduce surface complexation or adhesive interactions between interfaces of a liquid hydrocarbon and rock of a subterranean reservoir. In the following description, numerous specific details are set forth. However, it is understood that embodiments of the invention may be practiced without these specific details. In other instances, well-known equipment, components, structures and techniques have not been shown in detail in order not to obscure the understanding of this description.

I. Injectate Design and Generation System

Figure 1:
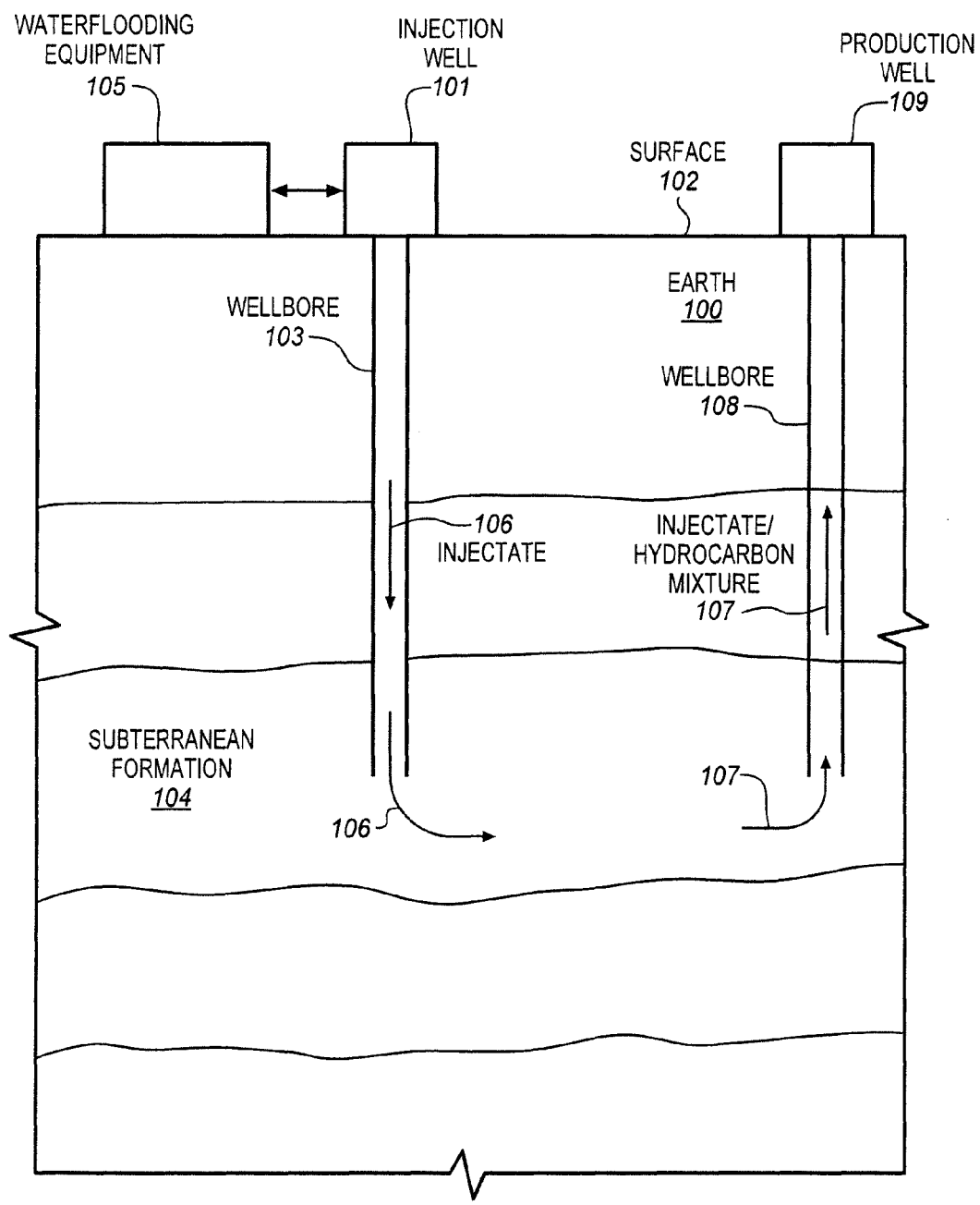
FIG. 1 is a cross-sectional side view illustrating an example of a prior art waterflooding procedure.
Figure 2:
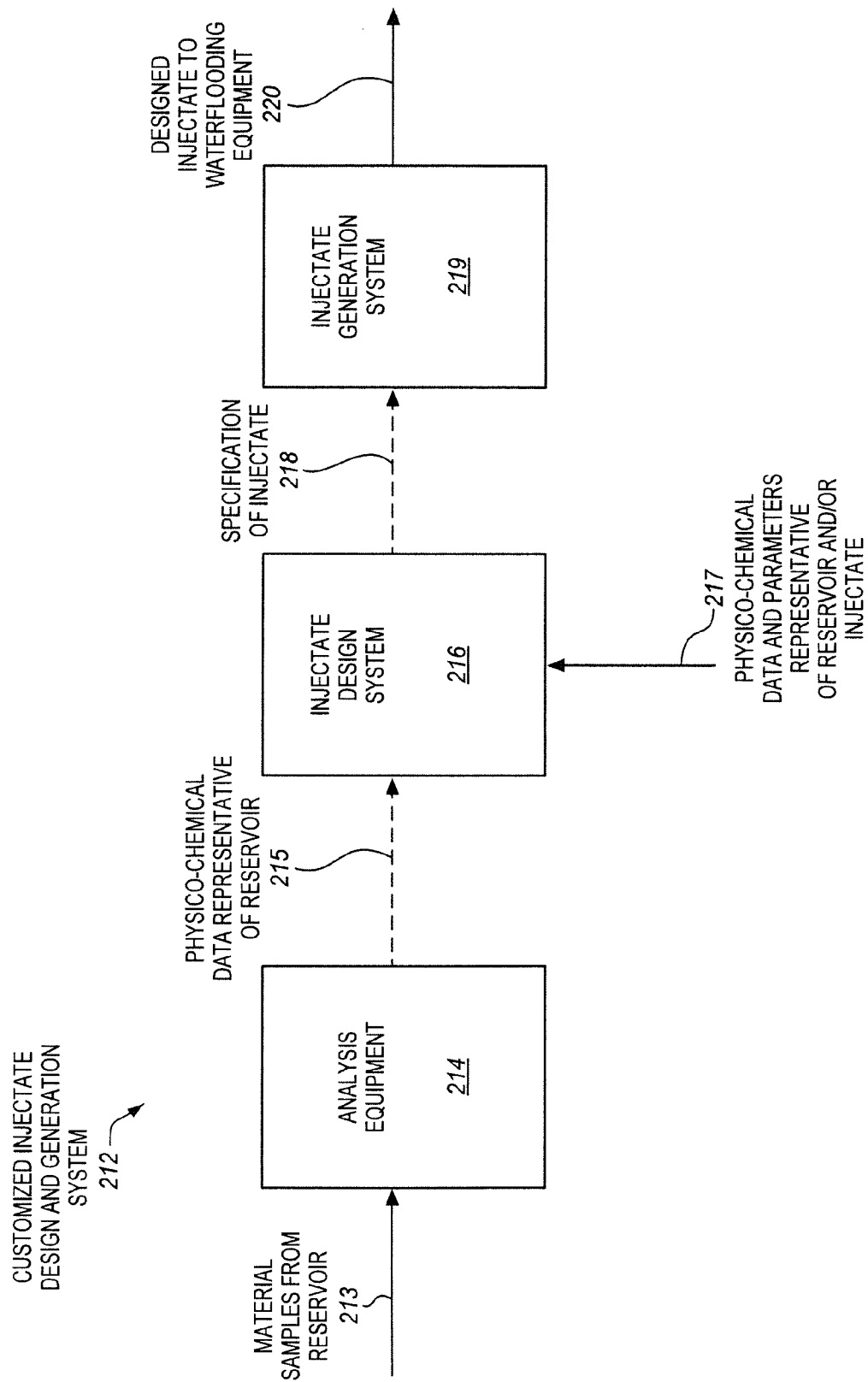
FIG. 2 is a block diagram of an example embodiment of a customized injectate design and generation system.

FIG. 2 is a block diagram of an example embodiment of a customized injectate design and generation system 212. The system includes analysis equipment 214, an embodiment of an injectate design system 216, and an injectate generation system 219.

In some embodiments, material samples 213 from a subterranean reservoir may be provided to the analysis equipment 214, although this is not required for other embodiments. By way of example, the material samples may include samples of liquid hydrocarbons from the reservoir, samples of connate water from the reservoir, samples of rock from the reservoir (e.g., sand, clays, mineral carbonates, etc.). The analysis equipment may include chemical analysis equipment (e.g., a pH meter, equipment to measure ionic strength, equipment to measure concentrations of carboxylic acids and nitrogen bases, etc.), physical analysis equipment (e.g., equipment to measure porosity), or a combination thereof.

The analysis equipment may analyze the material samples to obtain physico-chemical data representative of the reservoir. As used herein, physico-chemical data includes chemical and/or chemical data. By way of example, the physico-chemical data may include, but is not limited to, a concentration of organic acids (e.g., carboxylic acids, etc.) in the liquid hydrocarbon, a concentration of organic bases (e.g., amines and other nitrogen bases) in the liquid hydrocarbon, a pH of the connate, a pH buffer capacity of the connate, an ionic strength of the connate, a concentration of calcium cations ($Ca^{2+}$), magnesium cations ($Mg^{2+}$), and/or sulfate anions ($SO_4^{-2}$) of the connate, a characteristic of rock of the reservoir (e.g., sandstone, carbonate, clay content, kaolinite content, basal plane charge of a clay, etc.), and combinations thereof.

The analysis equipment 214 may provide the physico-chemical data 215 representative of the subterranean reservoir to the injectate design system 216. As shown by the dashed line representing the physico-chemical data, in some embodiments the analysis equipment may have an output that is coupled with an input of the injectate design system, such as, for example, by an electrical communication link (e.g., a wire, cable, network connection, etc.), a wireless communication link, etc., although this is not required. The injectate design system may also receive physico-chemical data and parameters 217 representative of the reservoir and/or an injectate from another source, such as, for example, by a practitioner manually entering the data through a user data input device, from a network connection, from a database, etc. It is to be appreciated that analysis equipment 214 is not required if the physico-chemical data is otherwise available (e.g., from previous reports, previous analysis, by estimating the data with data from similar reservoirs, etc.).

The injectate design system 216 may design an injectate based at least in part on the data 215, 217. In designing the injectate, the system may be operable to customize, tailor, optimize, or otherwise design the injectate based on the particular reservoir characteristics so that it is operable to reduce the extent of "adhesive" surface complexation between interfaces of the liquid hydrocarbon and reservoir rock. By reducing these adhesive interactions, the injectate may be operable to increase mobility of the liquid hydrocarbon and/or improve a waterflooding operation (e.g., increase oil recovery, reduce the amount of injectate needed to achieve a given recovery, etc.).

Designing the injectate may include designing one or more of a pH of the injectate, an ionic strength of the injectate, a concentration of one or more salts, a concentration of divalent ions (e.g., calcium cations ($Ca^{2+}$), magnesium cations ($Mg^{2+}$), sulfate anions ($SO_4^{-2}$), etc.), a buffer capacity of the injectate, a concentration of additives (e.g., surfactant, aluminum salts, ferric salts, sulfate, bisulfate, silicate, etc.). In some embodiments, additives may be determined for inclusion in the injectate which are operable to reduce chemical bonding between the liquid hydrocarbons and the reservoir rock and/or improve liquid hydrocarbon mobility and/or recovery for a particular subterranean reservoir.

The injectate design system 216 may provide a customized, tailored, optimized, or otherwise designed specification of an injectate 218. As shown by the dashed line, in some embodiments the injectate design system may have an output that is coupled with an input of the injectate generation system 219, such as, for example, by an electrical communication link (e.g., a wire, cable, network connection, etc.), a wireless communication link, etc., although this is not required. Alternatively, as another option, the designed specification of the injectate 218 may be manually input (e.g., by a practitioner) to the injectate generation system 219.

The injectate generation system 219 may generate a designed injectate 220 according to the received specification of the injectate 218. The injectate generation system may include physical equipment to generate the injectate. By way of example, the equipment may include, but is not limited to, a tank, mixer, chemical additive metering equipment, analysis equipment (e.g., a pH meter), a control system, etc. The injectate generation system may provide the designed injectate 220 to a suitable destination, such as, for example, to waterflooding equipment, a storage tank, storage truck, etc.

II. Adhesion of Liquid Hydrocarbon to Reservoir Rock

Figure 3:
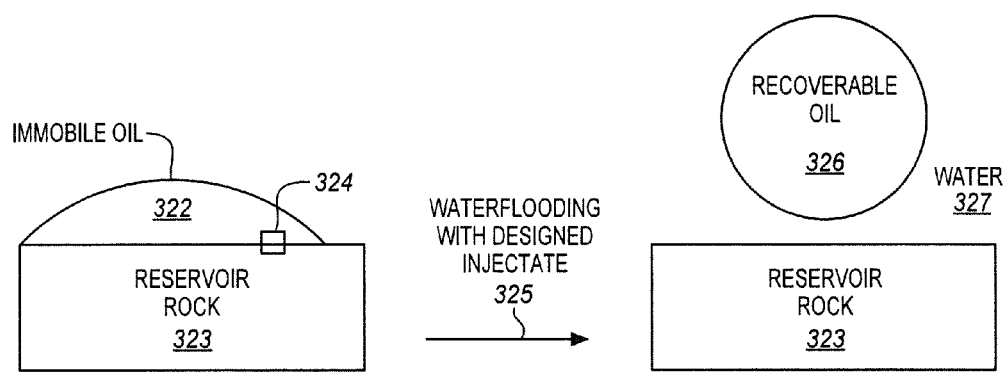
FIG. 3 is a cross-sectional side view illustrating conversion of immobile oil to mobile, recoverable oil with a waterflooding operation with a designed injectate.

An injectate designed to improve liquid hydrocarbon recovery may be operable to reduce the adhering interactions between the liquid hydrocarbon and reservoir rock. FIG. 3 is a cross-sectional side view illustrating conversion of immobile oil 322 to mobile, recoverable oil 326 with a waterflooding operation with a designed injectate 325. The immobile oil 322 intimately contacts or wets a surface of a reservoir rock 323. The immobile oil and the reservoir rock chemically coordinate, bond, or interact at a molecular level in a way that renders the oil immobile. The waterflooding operation with the designed injectate is operable to convert the immobile oil to the mobile, recoverable oil by disrupting, altering, reducing, or changing these chemical interactions. As shown as an example in the illustration, water 327 resulting from the injectate may wet the reservoir rock to free the recoverable oil as a discrete droplet that no longer adheres to the reservoir rock. The injectate increases oil recovery by locally decreasing the oil-wettability of the reservoir rock and increasing the water-wettability of the reservoir rock.

Figure 4:
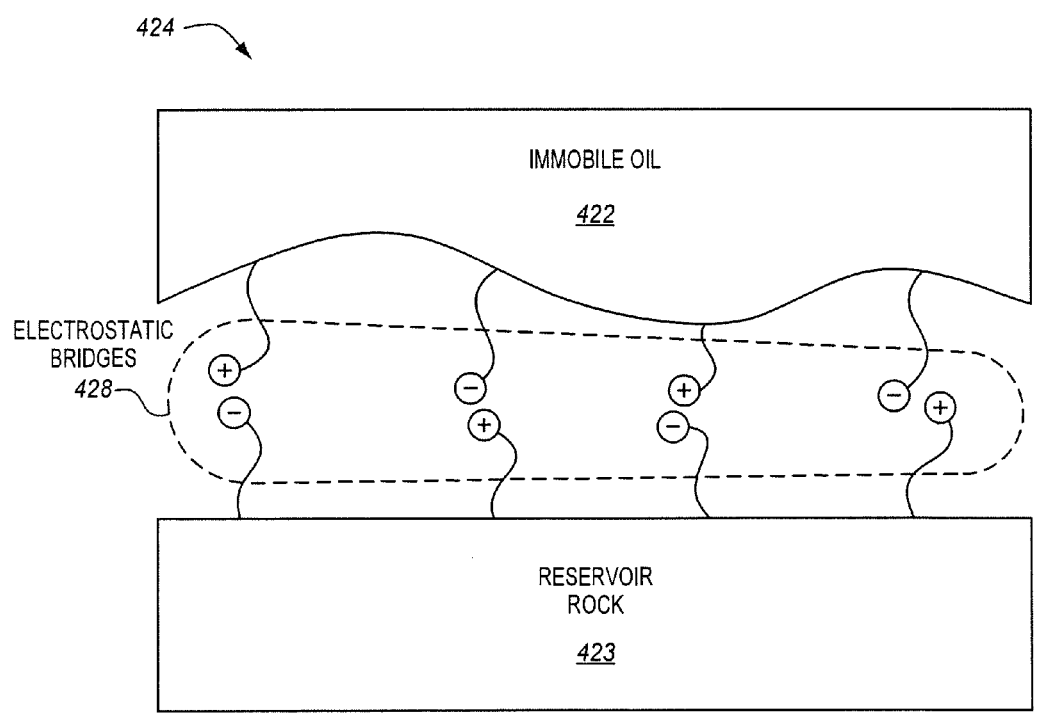
FIG. 4 is a cross-sectional side view of an expanded interfacial region at an interface between immobile oil and reservoir rock which illustrates electrostatic bridges between the immobile oil and the reservoir rock.

FIG. 4 is a cross-sectional side view of an expanded interfacial region 424 at an interface between immobile oil 422 and reservoir rock 423 which illustrates electrostatic bridges 428 between the immobile oil 422 and the reservoir rock 423. The expanded interfacial region 424 corresponds to region 324 of FIG. 3. The electrostatic bridges 428 represent chemical coordinations, bonds, or other chemical adhesion interactions between the immobile oil and the reservoir rock. In the electrostatic bridges, positively (+) and negatively (−) charged molecules dangling from an interface of the immobile oil coordinate electrostatically or otherwise chemically bond with oppositely charged molecules dangling from an interface of the reservoir rock.

By way of example, the positively charged molecules in the immobile oil may represent oil molecules with protonated amine or other nitrogen base groups (e.g., —$NH^+$), and the negatively charged molecules in the immobile oil may represent oil molecules with carboxylate groups (e.g., —$COO^-$). Representatively, the negatively charged species of the reservoir rock may represent anionic mineral surface groups, while the positively charged species of the reservoir rock may represent anionic mineral surface groups bonded to divalent cations.

The electrostatic bridges 428 may represent relatively strong, anhydrous, oil-reservoir rock bonds or interactions that hinder recovery of the oil. Injectates of embodiments may be designed to break these electrostatic bridges and/or create electrostatic repulsion between the oil-water and rock-water interfaces, which may help to facilitate water wetting of the rock interface and/or mobilization of the oil. When the oil-water and rock-water interfaces possess the same charge, this may cause repulsive forces that allow water to become disposed between the oil and the rock, which may tend to facilitate oil recovery.

III. Injectate Design System

Figure 5:
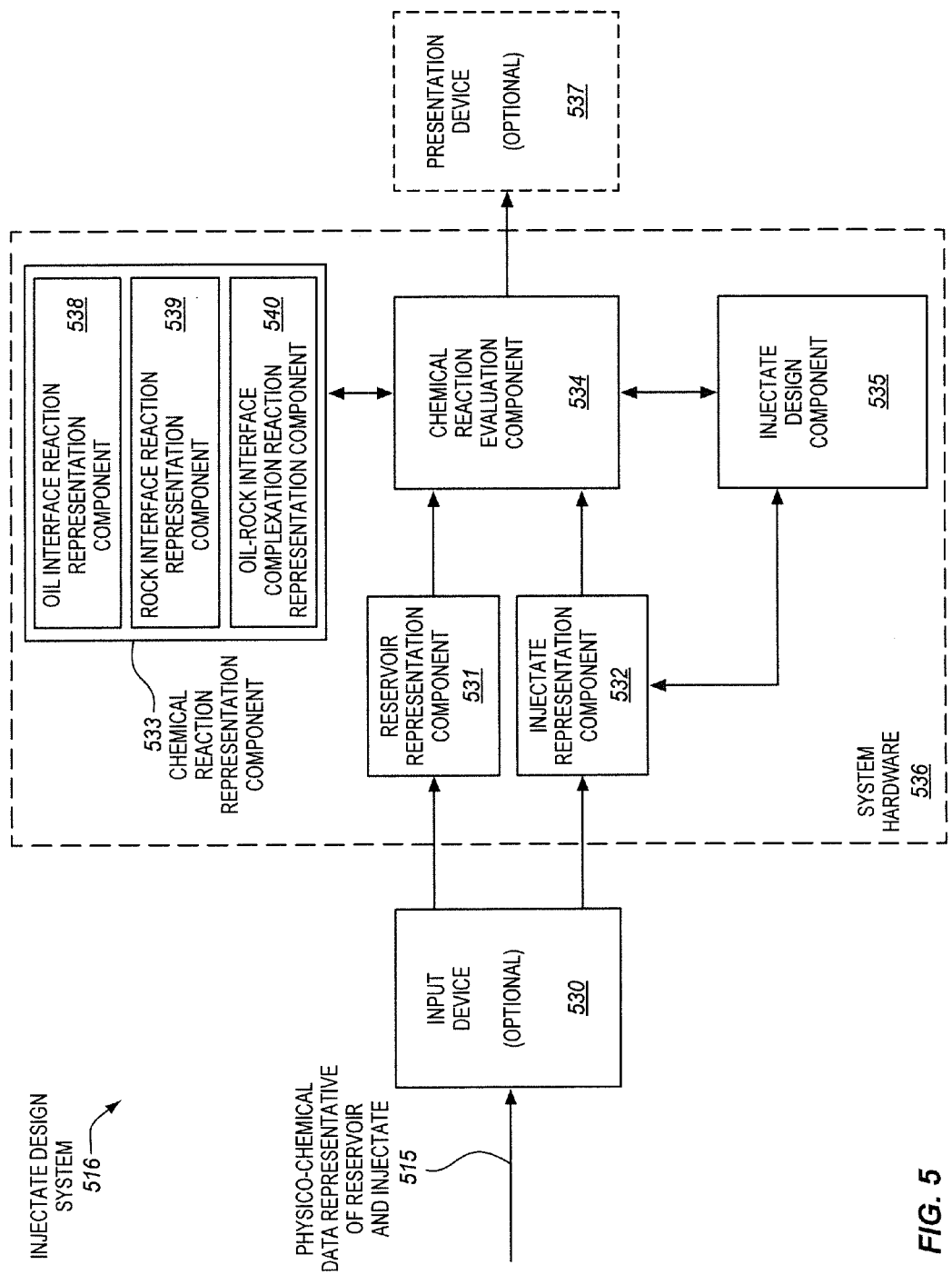
FIG. 5 is a block diagram of an example embodiment of an injectate design system.

FIG. 5 is a block diagram of an example embodiment of an injectate design system 516. The injectate design system may be used to represent and evaluate the affect of an injectate (e.g., injectate chemistry) on oil-rock interactions and/or oil mobility and design an injectate, for a particular reservoir, liquid hydrocarbon, and connate, to decrease the oil-rock interactions and increase oil mobility. The use of the injectate design system is not limited to designing an injectate. In other embodiments, the system may be used for other purposes, such as, for example, to analyze or determine where a waterflooding operation with an injectate will, or will not work, and/or to estimate additional expected recovery for a given waterflooding operation and/or a given injectate (e.g., for economic evaluation or forecasting).

The injectate design system 516 includes an optional input device 530, a subterranean reservoir representation component 531, an injectate representation component 532, chemical reaction representation component 533, a chemical reaction evaluation component 534, an injectate design component 535, and an optional presentation device 537.

The input device 530 is operable to receive physico-chemical data 515 representative of a subterranean reservoir and/or an injectate. In some embodiments, the input device may be a keyboard having alphanumeric keys to receive the input, cursor control device (e.g., a mouse to receive the input by mouse movements and clicks). Alternatively, the input device may be of another type, such as a network interface, input/output port, communication link with analysis equipment, etc.

The subterranean reservoir representation component 531 and the injectate representation component 532 are each coupled or in communication with the input device 530. The subterranean reservoir representation component is operable to store or include a representation of a subterranean reservoir. The representation may include the aforementioned types of physico-chemical data representing chemical characteristics of a liquid hydrocarbon, a connate, and a rock of a subterranean reservoir, such as, for example, nitrogen base and carboxylic acid content of the oil, connate pH, connate buffer capacity, etc. The injectate representation component is operable to store or include a representation of the injectate. The representation of the injectate may include the aforementioned types of physico-chemical data describing the injectate (e.g., pH, ionic strength, buffer capacity, etc.). Each may potentially include at least some of the physico-chemical data received through the input device.

The chemical reaction representation component 533 is operable to represent a set of chemical reactions that affect electrostatic bridging reactions, surface coordination or complexation reactions, or other chemical bonding interactions between the liquid hydrocarbon and the reservoir rock. As shown in the illustrated embodiment, the chemical reaction representation component may include a liquid hydrocarbon interface reaction representation component 538, a rock interface reaction representation component 539, and an oil-rock interface chemical complexation reaction representation component 540. A brief description of these components will be provided at this point, and then detailed example embodiments of each of these components will be provided further below.

The oil or liquid hydrocarbon interface reaction representation component 538 may represent one or more chemical reactions involving charged species at an interface of the oil or liquid hydrocarbon. In some embodiments, the oil or liquid hydrocarbon interface reaction representation component may represent a first acid-base equilibrium chemical reaction for protonation of nitrogen base groups of the liquid hydrocarbon, and a second acid-base equilibrium chemical reaction for deprotonation of carboxyl groups of the liquid hydrocarbon. The rock interface reaction representation component 539 may represent one or more chemical reactions involving charged species at an interface of the reservoir rock.

Each of these components 538, 539 may be used to, respectively, estimate the number of charged sites at the liquid hydrocarbon-water and reservoir rock-water interfaces as a result of multiple reactions occurring simultaneously and as a function of parameters, such as, for example, pH, ionic strength, temperature, mineralogy, oil surface chemistry (e.g., the number and nature of ionizable groups present), connate and injectate fluid composition (e.g., pH, ionic strength, ion concentrations), and various combinations thereof. Expressing these charged species or sites as a function of such parameters may help to allow evaluating how the number of charged sites and/or the extent of potential adhesion may be altered by an injectate during a water flooding operation, and may allow the composition and chemical attributes of the injectate to be adjusted to chemically favor oil-mineral separation and recovery.

The oil-rock interface chemical complexation reaction representation component 540 may represent one or more surface complexation chemical reactions between the charged species at the interfaces of the liquid hydrocarbon and the rock. This component may represent reactions affecting coordination of charged molecules from the liquid hydrocarbon-water interface to oppositely charged sites at reservoir rock or mineral surfaces. In some embodiments, this component may represent a surface complexation chemical reaction between positively charged protonated nitrogen base groups of the liquid hydrocarbon and negatively charged species of the reservoir rock, and a surface complexation chemical reaction between negatively charged carboxylate groups of the liquid hydrocarbon and positively charged species of the reservoir rock. Specific examples will be provided further below.

The chemical reaction evaluation component 534 is coupled or in communication with the reservoir representation component 531, the injectate representation component 532, and the chemical reaction representation component 533. The reaction evaluation component 534 is operable to evaluate the reactions of the reaction representation component based on the representations of the reservoir and injectate representation components. In some embodiments, the chemical reaction evaluation component may take into consideration other factors such as kinetic considerations, transport phenomenon, diffusion models, mineral dissolution and precipitation models, etc. In some embodiments, the reaction evaluation component may include a reaction path evaluation component, which simultaneously calculates the extent of adsorption, aqueous speciation, and mineral dissolution and precipitation, in response to injectate (and/or gas) addition and/or changes in temperature and pressure. An example of a suitable reaction evaluation components of embodiments include, but are not limited to, PHREEQC available from the United States Geologic Survey. Other reaction path evaluation components which take into account either the same, less, more, or different aspects, may alternatively optionally be used as appropriate for the particular implementation.

The injectate design component 535 is coupled or in communication with the chemical reaction evaluation component 534 and with the injectate representation component 532. The injectate design component 535 may receive a result of the evaluation of the chemical reactions and may improve, optimize, or otherwise design the injectate based on the result so that the injectate is operable to reduce an extent of surface complexation between the charged species at the interfaces of the liquid hydrocarbon and the rock. In some embodiments, this may include designing one or more chemical attributes of the injectate, such as, for example, a pH of the injectate, an ionic strength of the injectate, a concentration of one or more salts, a concentration of divalent ions (e.g., calcium cations ($Ca^{2+}$), magnesium cations ($Mg^{2+}$), sulfate anions ($SO_4^{-2}$), etc.), a buffer capacity of the injectate, a concentration of additives (e.g., surfactant, aluminum salts, ferric salts, sulfate, bisulfate, silicate, etc.). In some embodiments, the designed injectate may be a low salinity or so-called low-sal injectate having a salt concentration significantly less than that of seawater. In some embodiments, a combination of chemical attributes of the injectate may be determined to be operable to achieve an optimal or at least high level of liquid hydrocarbon recovery customized to a particular reservoir.

Different ways of designing the injectate are contemplated. In some embodiments, chemical attributes of the injectate may be changed according to a Monte Carlo method, random walk, or pseudo random walk type method. Results may be evaluated for many different combinations of chemical attributes and the best result(s) and corresponding set(s) of parameters may be identified. In other embodiments, deterministic or more deterministic type methods may be used to change chemical attributes of the injectate and optimize or design the injectate. In still other embodiments, nonlinear optimization algorithms may be used to change chemical attributes of the injectate and optimize or design the injectate. In still further embodiments, chemical attributes of the injectate may be changed and designed manually through interaction with the system hardware (e.g., by way of user input device and processing/computation performed by the system hardware) based on heuristics, collective knowledge, practitioner expertise, or the like. Those skilled in the art and having the benefit of the present disclosure will appreciate that still other ways of designing the injectate are contemplated.

The presentation device 537 is coupled or in communication with the chemical reaction evaluation component 534. Results of the evaluations of the waterflooding operations may be provided to the presentation device. Examples of suitable presentation devices include, but are not limited to, monitors and other display devices, printers and other hardcopy devices, network connections, and combinations thereof. Another example of a presentation device is a communication link to an injectate generation system.

The reservoir representation component 531, the injectate representation component 532, the chemical reaction representation component 533, the chemical reaction evaluation component 534, and the injectate design component 535, may be implemented on system hardware 536. These components may configure the system hardware as a particular injectate design system and/or surface complexation evaluation system. The system hardware may include one or more microprocessors to process data, optionally one or more co-processors (e.g., graphics co-processors, math co-processors, hardware accelerators, etc.) to process data, one or more different types of memory to store data, one or more buses or other interconnects to communicate data between the processors and memory, as well as other optional types of hardware components. By way of example, reservoir and injectate representation components and the chemical reaction representation component may include data stored in a memory, the chemical reaction evaluation component may receive data from the memory over the interconnects and may evaluate the reactions using hardware circuitry of the one or more processors. In some embodiments, the hardware components may be those of a workstation. In other embodiments, the hardware components may be those of a mainframe.

IV. Injectate Design Method

Figure 6:
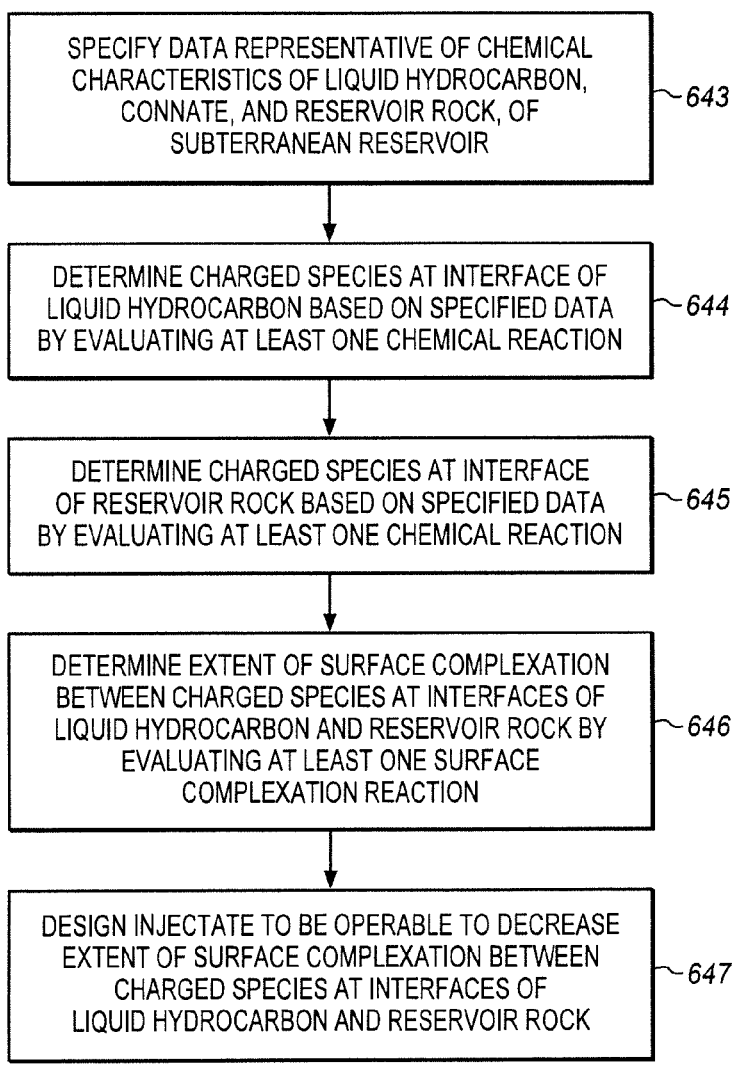
FIG. 6 is a block flow diagram of an example embodiment of a method of designing an injectate to be used in a waterflooding operation.

FIG. 6 is a block flow diagram of an example embodiment of a method 642 of designing an injectate to be used in a waterflooding operation. The method may be implemented on system hardware, such as, for example, one or more processors, one or more memories, one or more buses, of a general-purpose or special-purpose computer system. In some embodiments, the method may be performed by an injectate design system similar to that shown in FIG. 5. Alternatively, the method may be performed by an entirely different injectate design system. Moreover, it is to be appreciated that the injectate design system of FIG. 5 may perform either a similar method, or an entirely different method.

Data representative of chemical characteristics of a liquid hydrocarbon, a connate, and a reservoir rock, of a subterranean reservoir, may be specified, at block 643. For example, the aforementioned different types of physico-chemical data may be specified.

Charged species at an interface of the liquid hydrocarbon may be determined based on the specified data by evaluating at least one chemical reaction, at block 644. In some embodiments, this may include evaluating a first acid-base equilibrium chemical reaction for protonation of nitrogen base groups of the liquid hydrocarbon, and evaluating a second acid-base equilibrium chemical reaction for deprotonation of carboxyl groups of the liquid hydrocarbon. In this embodiment oil acid and base numbers may be used to estimate the abundance of carboxyl and nitrogen base groups in the oil. In some embodiments, reactions for one or more of divalent cations (e.g., calcium cations, magnesium cations, etc.) and/or anions (e.g., sulfate anions, bicarbonate anions, etc.) may optionally be represented.

Charged species at an interface of the reservoir rock may be determined based on the specified data by evaluating at least one chemical reaction, at block 645. In some embodiments, the charged species may be evaluated for clays, quartz, or other rocks associated with a sandstone subterranean reservoir. For example, in the case of kaolinite, reactions pertinent to edge and potentially basal plan charge may be represented. In other embodiments, the charged species may be evaluated for calcite, dolomite, carbonate, or other rocks associated with a mineral carbonate subterranean reservoir. In some embodiments, reactions for one or more of divalent cations (e.g., calcium cations, magnesium cations, etc.) and/or anions (e.g., sulfate anions, bicarbonate anions, etc.) may optionally be represented.

An extent of surface complexation between the charged species at the interfaces of the liquid hydrocarbon and the reservoir rock may be determined by evaluating at least one surface complexation reaction, at block 646. In some embodiments, this may include evaluating a first surface complexation reaction between positively charged protonated nitrogen base groups of the liquid hydrocarbon and negatively charged species of the reservoir rock, and evaluating a second surface complexation reaction between negatively charged carboxylate groups of the liquid hydrocarbon and positively charged species of the reservoir rock. In some embodiments, this may include evaluating a third surface complexation reaction between positively charged calcium carboxylate groups of the liquid hydrocarbon and negatively charged species of the reservoir rock.

The injectate may be designed to be operable to decrease the extent of the surface complexation between the charged species at the interfaces of the liquid hydrocarbon and the reservoir rock, at block 647. In some embodiments, the injectate may be generated according to the design and introduced into the subterranean reservoir during a waterflooding operation.

V. Example Embodiment of Oil Interface Reaction Representation Component

As previously mentioned, in some embodiments, the predominant charged sites at an oil-water interface may be due to acidic and basic groups of organic molecules of the oil. Commonly, these acidic and basic groups may include predominantly carboxylic acid groups and nitrogen base groups. The oil interface reaction representation component may represent reactions involving these carboxylic acid groups and nitrogen base groups. In other embodiments, depending upon the particular oil, additional reactions involving other charged species (e.g., other acidic or basic groups) may be incorporated. The acidic and basic groups most prevalent in a particular oil may be readily determined by well known analytical chemical methods. It also should be appreciated that including reactions for both carboxylic acid groups and nitrogen base groups is not required if a particular oil has an insignificant amount of one of these types of functional groups.

Measured zeta potentials of oil droplets in water may be approximately modeled as the sum of acid and base groups (e.g., carboxylic acid groups and nitrogen base groups), whose surface acidity constants are roughly equivalent to their aqueous values. The polar nitrogen groups expressed at the oil-water interface tend to be weak bases, are commonly linked to heterocyclic aromatic groups, and generally have 25° C. p$K_a$s in the range of about 5 to 6.5. Temperature may be assumed to have a similar effect on acidic and basic groups exposed at the oil-water interface as it does on monomeric carboxylic acids and weak nitrogen bases (e.g., quinoline, pyridine, or similar nitrogen bases), respectively. Carboxylate deprotonation reactions have enthalpies on the order of around 0 kJ/mol, which means that a temperature increase at constant pH should not significantly affect the charge on a carboxylate group exposed at the oil-water interface. In contrast, the p$K_a$s of weak nitrogen basic groups tend to decrease with increasing temperature. In one aspect, this may be approximated according to the expression $-d(pK_a)/dT(°K)=0.016$. This expression suggests a decrease in the p$K_a$s of the weak nitrogen basic groups of approximately 1.2 units when the temperature increases from 25° C. to 100° C. This corresponds to a reaction enthalpy of approximately 34 kJ/mol.

Figure 7:
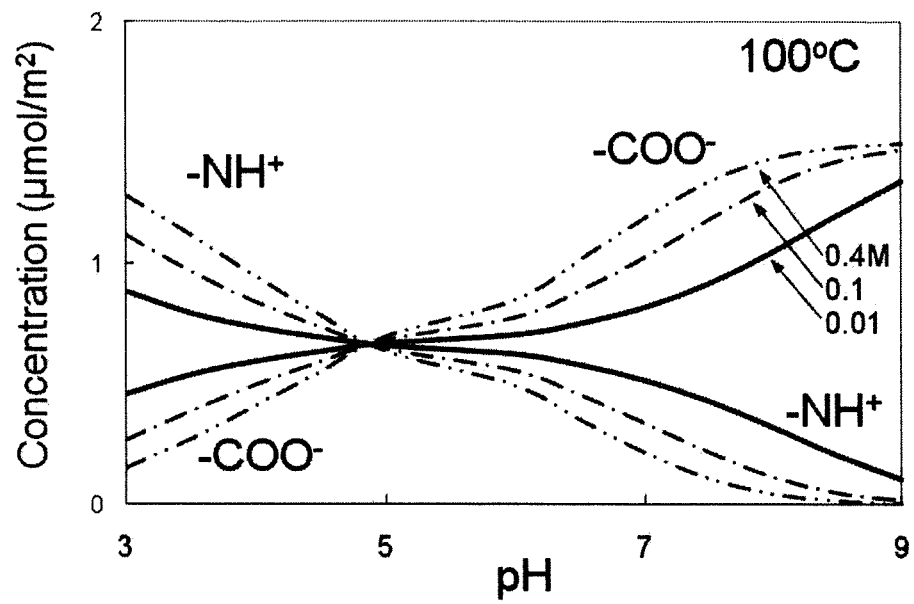
FIG. 7 is a plot of an example of calculated ionic strength-dependent and pH-dependent surface charge of an example embodiment of an oil-water interface.

FIG. 7 is a plot of calculated ionic strength-dependent and pH-dependent 100° C. surface charge of an example embodiment of an oil-water interface having nitrogen base and carboxylate groups that deprotonate as shown in Reactions 1 and 2.

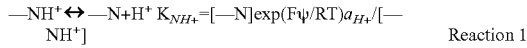

Reaction 1

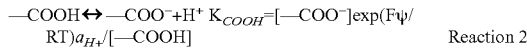

Reaction 2

In Reactions 1 and 2, —COOH and —NH$^+$ represent dangling carboxylic acid and protonated nitrogen base groups present at the oil-water interface, respectively. Similarly, —N represents a dangling nitrogen basic group and —COO$^-$ represents a dangling carboxylate group. The Ks are equilibrium constants. Bracketed terms are surface concentrations (μmoles/m$^2$), F is Faraday's constant, ψ is the surface potential, is the activity of the hydrogen ion, R is the gas constant, and T is absolute temperature.

In this example embodiment, a diffuse layer model was used to model the electric double layer. The diffuse layer model represents a surface layer with a pH-dependent surface charge and a Gouy-Chapman diffuse layer of counterions. Specifically sorbed ions reside on the surface layer. Temperature-dependent acidity constants were used as input to the diffuse layer model. The NH$^+$ and carboxylic acid pKs of this embodiment were set to 4.8 and 5.0, respectively. In alternate embodiments, other models besides the diffuse layer model may optionally be used.

In the calculations of this example embodiment, the nitrogen base and carboxylate groups are assumed to be equal in number and to have a total amount of 3.33 μmol/m$^2$, equal to a total site density of 2 sites/nm$^2$. In alternate embodiments, the relative proportions of acid and base groups need not be assumed to be equal but rather may be changed according to the particular oil being represented.

In this example embodiment, the oil-water surface area and mass were set to about 10 m$^2$/g and about 100 grams of oil per liter of water. When oil adheres to rock the surface area of the oil-water interface may approximate that of the mineral-water interface. The mineral-water interface surface area may tend to vary widely for different types of reservoir rocks or minerals. The value 10 m$^2$/g selected for this model tends to be a mid-range value for sandstones and tends to be characteristic of clays such as kaolinite. Other values appropriate for other rocks (e.g., mineral carbonates) may be used in other embodiments.

Referring again to FIG. 7, as shown at pH greater than about 4.9, increases in ionic strength increase the number of deprotonated carboxylate groups and interfacial negative charge. At pH less than about 4.9, increases in ionic strength increase the number of protonated nitrogen bases and positive surface charge. Ionic strength has the opposite effect on zeta potentials whose absolute values decrease with increasing ionic strength. Different curves are included for sodium chloride (NaCl) concentrations of 0.4M, 0.1M, and 0.01M.

Exposed interfacial carboxylate groups (—COO$^-$) and protonated nitrogen base groups (—NH$^+$) dangling from the oil-water interface may tend to attract oppositely charged ions. Commonly, for (—COO$^-$) these ions may include monovalent cations such as Na$^+$ and divalent cations such as Ca$^{2+}$. Similarly, for (—NH$^+$) these ions may include monovalent anions such as and divalent anions such as SO$_4^{2-}$. In other embodiments, other types of ions may also optionally be considered, but are generally less prevalent than the aforementioned ions in many oilfield brines. Also, in other embodiments, it may not be needed to model certain of these ions, for example if they are not present in the reservoir under consideration. In this embodiment it is assumed that electrostatic repulsion should prevent near neighbor pairs of like-charged surface sites and thus make unlikely bidentate coordination of $Ca^{2+}$ and $SO_4^{2-}$, although this aspect may be modeled if desired.

In one embodiment, $Ca^{2+}$ coordination to bitumen carboxylate groups may be approximated by a calcium-carboxylate surface complexation constant equal in value or based on that of a calcium-carboxylate aqueous complex, as shown by Reaction 3.

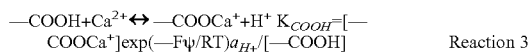

—COOH+$Ca^{2+}$ ↔ —COO$Ca^+$+$H^+$ $K_{COOH}$=[—COO$Ca^+$]exp(—Fψ/RT)$a_{H+}$/[—COOH]  Reaction 3

The effect of $Ca^{2+}$ on oil-water surface charge may be represented using the reaction shown by Reaction 3 and a log $K_{COOH}$ at 25° C. of approximately −3.8. The effect of temperature on the reaction of Reaction 3 may be approximated by the effect of temperature on the calcium-carboxylate aqueous complexation constant. For example, the enthalpy of the reaction of Reaction 3 may be approximately 1.17 kJ/mol, taken from the Lawrence Livermore National Laboratory thermo.com.V8.R6.230 thermodynamic database for formation of the Ca-acetate complex (Similar calculations pointed to only minor sorption of sulfate to dangling amide groups). For the $Ca^{2+}$+$H_2O$ ↔ $CaOH^+$+$H^+$ reaction, the 25° C. log K may be approximated as −12.85, and the enthalpy may be approximated as 18.31 kcal/mole. The log K is derived from the data0.ymp.r5d data base (Yucca Mountain Repository Program 2006). The enthalpy was derived from the 0-100° C. log K grid. The site densities of —NH and COOH groups at the oil-water interface may be as described previously.

Figure 8:
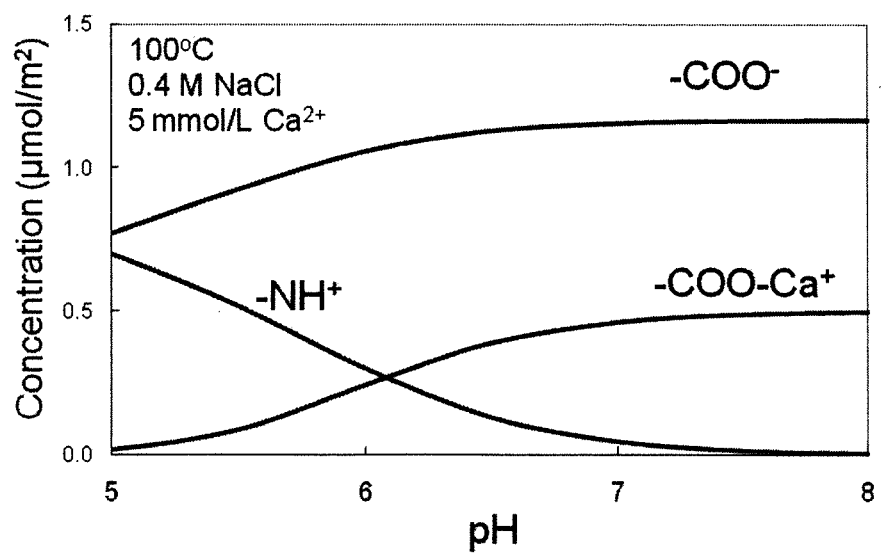
FIG. 8 is a plot of an example of calculated pH-dependent oil-water surface speciation for a brine/oil system showing the effect of divalent calcium ions on oil-water charged surface group abundances.

FIG. 8 is a plot of an example of calculated pH-dependent oil-water surface speciation at 100° C. for a brine/oil system showing the effect of divalent calcium ions ($Ca^{2+}$) on oil-water charged surface group abundances. This embodiment assumes a 9:1 (v/v) brine:oil system with the brine being a 0.4 M NaCl solution containing 5 mmol/L $Ca^{2+}$. As before, the oil surface area was set to 10 $m^2$/g and the total site density to 2 sites/$nm^2$ (one carboxyl site/$nm^2$ and one nitrogen base site/$nm^2$).

Table 1 lists an example embodiment of oil interface reactions and thermodynamic data that may be used to evaluate charged species on oil interfaces.

TABLE 1

Example Embodiment of Oil Interface Reactions Representation

| Reaction | 25° C. log K | Enthalpy (kJ/mol) | Site density (μmol/$m^2$) |
|---|---|---|---|
| Oil-Water Interface | | | —N: 1.67, —COO 1.67 (can be varied) |
| —$NH^+$ ↔ —N + $H^+$ | −6.0 | 34 | |
| —COOH ↔ —$COO^-$ + $H^+$ | −5.0 | 0 | |
| —COOH + $Ca^{2+}$ ↔ —COO$Ca^+$ + $H^+$ | −3.8 | 1.171 | |

VI. Example Embodiment of Rock Interface Reaction Representation Component for Sandstone and/or Clay Containing Reservoirs In some embodiments, the subterranean reservoir may be in a sandstone formation, and oil adhesion to, sandstone minerals may be evaluated. Sandstone reservoir mineral surface chemistry may be approximated as a sum of quartz, feldspar, and clay surface chemistry, plus that of any metal (hydr)oxide coatings. For a given mineral, the charge may be the net of pH-dependent protonation/deprotonation reactions and cation/anion sorption reactions. The surface reactivity of clays often dominates, in part, because of small grain size, high specific surface areas, and because their morphology provides a high concentration of unsatisfied bonds at sheet edges. Clay surface charge may include a sum of edge and basal plane charge, the latter caused by heterovalent substitution in the lattice. Kaolinite is a common clay in sandstones. Although pure kaolinite has no heterovalent substitution, and correspondingly no significant basal plane charge, impurities may cause natural kaolinites to possess measurable basal plane charge, which will be considered further below. Edge charge depends on pH and may be represented by the following protonation/deprotonation reactions:

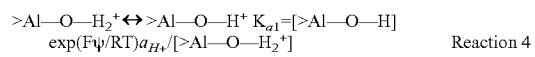

>Al—O—$H_2^+$ ↔ >Al—O—$H^+$ $K_{a1}$=[>Al—O—H] exp(Fψ/RT)$a_{H+}$/[>Al—O—$H_2^+$]  Reaction 4

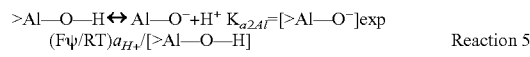

>Al—O—H ↔ Al—$O^-$+$H^+$ $K_{a2Al}$=[>Al—$O^-$]exp (Fψ/RT)$a_{H+}$/[>Al—O—H]  Reaction 5

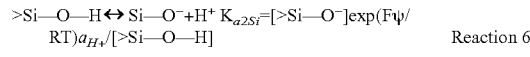

>Si—O—H ↔ Si—$O^-$+$H^+$ $K_{a2Si}$=[>Si—$O^-$]exp(Fψ/RT)$a_{H+}$/[>Si—O—H]  Reaction 6

In these reactions, >Al—O and >Si—O represent Al and Si edge sites. Increased temperature tends to increase the edge site equilibrium constants for Reactions 5 and 6 ($K_{a2}$) thus increasing negative surface charge. A diffuse layer model was manually fit to the 25° C. and 60° C. 0.01-0.1M NaCl kaolinite published surface charge data to calculate the combined effects of temperature and ionic strength on kaolinite edge charge. The fitted model is described by site densities of about 1.15 sites/$nm^2$ (1.92 μmol/$m^2$) for both Al and Si sites, 25° C. pK values for $pK_{a1}$ of about 3.0, for $pK_{a2,Al}$ of about 3.8, and for $pK_{a2Si}$ of about 7.0, and reaction enthalpies for $\Delta H_{a1}$ of about 0 kJ/mol, $\Delta H_{a2,Al}$ of about 32 kJ/mol, and $\Delta H_{a2,Si}$ of about 32 kJ/mol. The effect of temperature on Reaction 4 may in one aspect be disregarded, or in another aspect may be modeled with a significant decrease in $K_{a1}$ with temperature.

Figure 9:
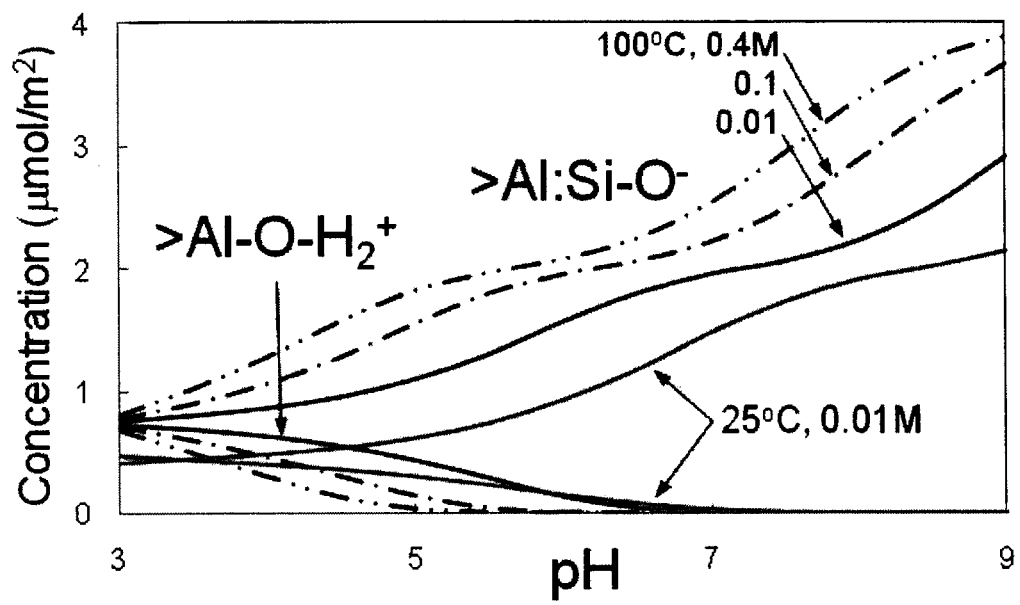
FIG. 9 is a plot of the calculated effect of temperature and ionic strength on kaolinite edge surface species abundances.

FIG. 9 is a plot of the calculated effect of temperature and ionic strength on kaolinite edge surface species abundances. The temperatures considered were 25° C. and 100° C. The ionic strength was adjusted with 0.01, 0.1, and 0.4M NaCl solutions. The concentration of kaolinite in solution was 300 $m^2$/L. In the illustration, >Al:Si—$O^-$ is the sum or combination of >Al—$O^-$ and >Si—$O^-$. As shown in the illustration, there is an increase in negative surface charge (e.g., >Al:Si—$O^-$) with increasing temperature and increasing ionic strength. This suggests that sorption of divalent cations, such as $Ca^{2+}$, to kaolinite edges will be particularly favored at higher, reservoir temperatures. Although $Na^+$ and $Cl^-$ are typically the dominant cation and anion in reservoir brines, $Ca^{2+}$, $Mg^{2+}$, and in some cases $SO_4^{2-}$ may also optionally be considered, in embodiments when they are present in the brine, because of their potential to sorb and locally reverse the charge of mineral surfaces and help, or hinder, bridging of the oil-water and mineral-water interfaces. These results for kaolinite edges may also be relevant to edge charge on other types of clays.

In some embodiments, reactions between divalent cations, such as $Ca^{2+}$ and $Mg^{2+}$, if present in the oilfield brine, and kaolinite or other clay edge sites may be considered. Increased edge acidity at higher temperature tends to increase sorption of such divalent cations when they are present. Alternatively, these reactions need not be included if the oilfield brine lacks these divalent cations, or their levels are considered negligible for the particular implementation.

The ion sorption may be mono-dentate, bi-dentate, or a combination thereof. The mono-dentate sorption may involve one mineral site, while the bi-dentate sorption may involve two nearby mineral sites. At higher pH, there may be adsorption of hydroxylated metal cations, such as $CaOH^+$. Mono-dentate and bi-dentate adsorption of divalent calcium cations ($Ca^{2+}$) and adsorption of hydroxylated metal cations ($CaOH^+$) may be expressed by the following Reactions (R7-R9):

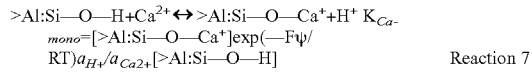

Reaction 7

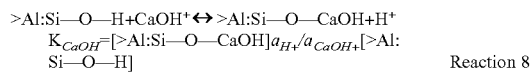

Reaction 8

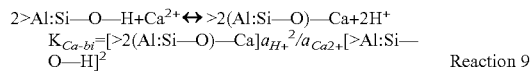

Reaction 9

In parallel, $Ca^{2+}$ can be exchanged for cations on the basal planes of impure natural clays such as kaolinites:

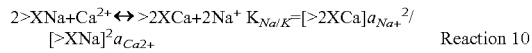

Reaction 10

In Reaction 10, >X represents a negatively charged basal plane site. Basal plane ion exchange tends to be insensitive to pH, while edge sorption tends to depend more strongly on pH. Relatively pure kaolinites interact electrostatically with oil predominantly though their edges. The interactions between kaolinite basal planes and oil-water interfaces tend to be less significant than the edge interactions, unless the kaolinite is particularly impure and possesses a high basal plane charge. In some embodiments, basal plane charge may be considered where it is expected to contribute significantly, or in other embodiments it may be omitted where it is expected to contribute negligibly. Analogous reactions to those above for calcium cations ($Ca^{2+}$) may be used to represent magnesium cations ($Mg^{2+}$).

Figure 10:
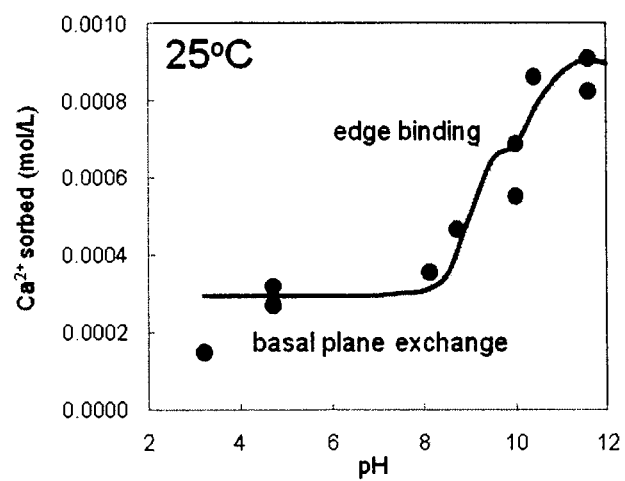
FIG. 10 shows a plot of calcium cation kaolinite sorption data fit with a diffuse layer model.

FIG. 10 shows a plot of published 25° C. $Ca^{2+}$ kaolinite sorption data fit with a diffuse layer model that includes mono-dentate edge binding of $Ca^{2+}$ and $CaOH^+$ and basal plane exchange as represented by Reactions 7, 8, and 10. The sorption data was published in "Coagulation of bitumen with kaolinite in aqueous solutions containing Ca2+, Mg2+, and Fe3+," Journal of Colloid and Interface Science, 324: 85-91, by Gan et al., 2008. The curve was calculated with PHRE-EQC using the diffuse double layer model for kaolinite. Parameters used in the calculations included 50 g/L kaolinite, a total concentration of $Ca^{2+}$ of 1 mmol/L, a basal exchange site density of 0.6 mmol/L, and an edge site density of 2 mmol/L. The log Ks for monodentate sorption of $Ca^{2+}$ (−9.7) and $Ca(OH)^+$ (−4.5) onto >Al—O—H and >Si—O—H sites. The constant for Ca/Na exchange (log K=0.8) was used for basal plane exchange.

The pH<8 portion of the curve is believed to primarily represent basal plane exchange of $Ca^{2+}$. Edge sorption of $Ca^{2+}$ is believed to dominate at pH>8 where edge sites are increasingly negatively charged (see e.g., FIG. 9). A similar published $Mg^{2+}$ sorption isotherm parallels the $Ca^{2+}$ isotherm but is displaced to lower pH by approximately 1 unit, indicating higher values of the magnesium binding constants.

The effect of temperature on $Ca^{2+}$ sorption onto kaolinite edges may be inferred from temperature-dependent sorption of other cations. Temperature has been reported to move $Cd^{2+}$ and $Co^{2+}$ kaolinite edge sorption curves 0.8 to 1.8 pH units lower when temperature is raised from 25 to 70° C. Increasing temperature may likewise lead to sorption of $Ca^{2+}$ at lower pH. Sorption enthalpies in the range of 20 kJ/mol to 70 kJ/mol, or about 45 kJ/mol, may be used to estimate sorption $Ca^{2+}$ and $CaOH^+$ at higher temperatures through the van't Hoff equation.

Table 2 lists an example embodiment of kaolinite interface reactions and thermodynamic data that may be used to evaluate charged species on kaolinite interfaces.

TABLE 2

Example Embodiment of Kaolinite Interface Reactions Representation

| Reaction | 25° C. log K | Enthalpy (kJ/mol) | Site density (μmol/m²) |
|---|---|---|---|
| Kaolinite Edges | | | >Al: 1.92, >Si: 1.92 |
| >Al—O—$H_2^+$ ↔ >Al—O—H + $H^+$ | −3.0 | 0 | |
| >Al—O—H ↔ >Al—$O^-$ + $H^+$ | −3.8 | 32 | |
| >Si—O—H ↔ >Si—$O^-$ + $H^+$ | −7.0 | 32 | |
| >Al—O—H + $Ca^{2+}$ ↔ >Al—O—$Ca^+$ + $H^+$ | −9.7 | 45 | |
| >Si—O—H + $Ca^{2+}$ ↔ >Si—O—$Ca^+$ + $H^+$ | −9.7 | 45 | |
| >Al—O—H + $CaOH^+$ ↔ >Al—O—CaOH + $H^+$ | −4.5 | 45 | |
| >Si—O—H + $CaOH^+$ ↔ >Si—O—CaOH + $H^+$ | −4.5 | 45 | |
| Kaolinite Basal Plane | | | |
| 2 > XNa + $Ca^{2+}$ ↔ >2XCa + 2$Na^+$ | 0.8 | 7.2 | |

VII. Example Embodiment of Oil-Rock Interface Complexation Reaction Representation Component The reactions and thermodynamic data in Tables 1 and 2 allow calculation of the concentrations of the most abundant charged species on the oil-water and kaolinite-water interfaces before and after, a waterflooding operation with an injectate. Charged species from the oil interface (e.g. —$NH^+$) may then be paired with oppositely charged species from the kaolinite edge (e.g. >Al:Si—$O^-$) to form electrostatic bridges (e.g., [—$NH^+$][>Al:Si—$O^-$]). The more electrostatic bridges formed, the greater the adhesive forces between the oil and the reservoir. Conversely, injectate chemistries that are operable to decrease the number of electrostatic bridges may tend to increase oil mobility and enhance oil recovery.

Figure 11:
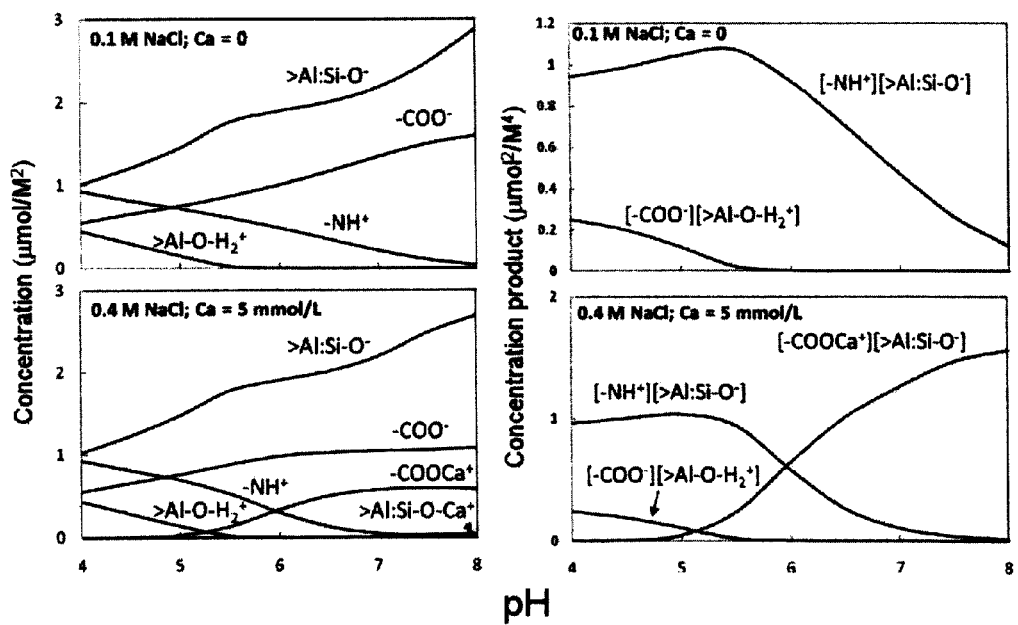
FIG. 11 shows plots of kaolinite-water and oil-water speciation (on the left hand side) and electrostatic bridges (on the right hand side).

FIG. 11 shows plots of kaolinite-water and oil-water speciation at 100° C. (on the left hand side) and electrostatic bridges (on the right hand side) for a 0.1 M NaCl, calcium-free solution (on the top), and 0.4 M NaCl 5 mmol/L Ca solution (on the bottom). The calculation was done for calcium-free 0.1 M NaCl solution as an injectate and a 0.4M NaCl solution initially containing 5 mmol calcium cations as a connate. The plots are constructed for a sandstone (20% kaolinite by volume, the rest quartz) reservoir having a porosity of 0.2; 9:1 (v/v) water:oil. Quartz surface chemistry is not considered in this case because kaolinite, with a much higher specific surface area, is expected to be more significant than the quartz. The two attraction bridges determined to be relatively more important to oil-kaolinite adhesion are the linking of >Al:Si—O$^-$ sites with protonated nitrogen bases (—NH$^+$) and with positively charged calcium carboxylate groups (—COOCa$^+$) at the oil-water interface, as shown by the following reactions:

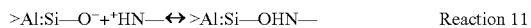
Reaction 11

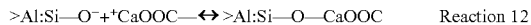
Reaction 12

Coordination of positively charged aluminol sites (>Al-O—H$_2{}^+$) with carboxylate sites is significant near pH 5.

Figure 12:
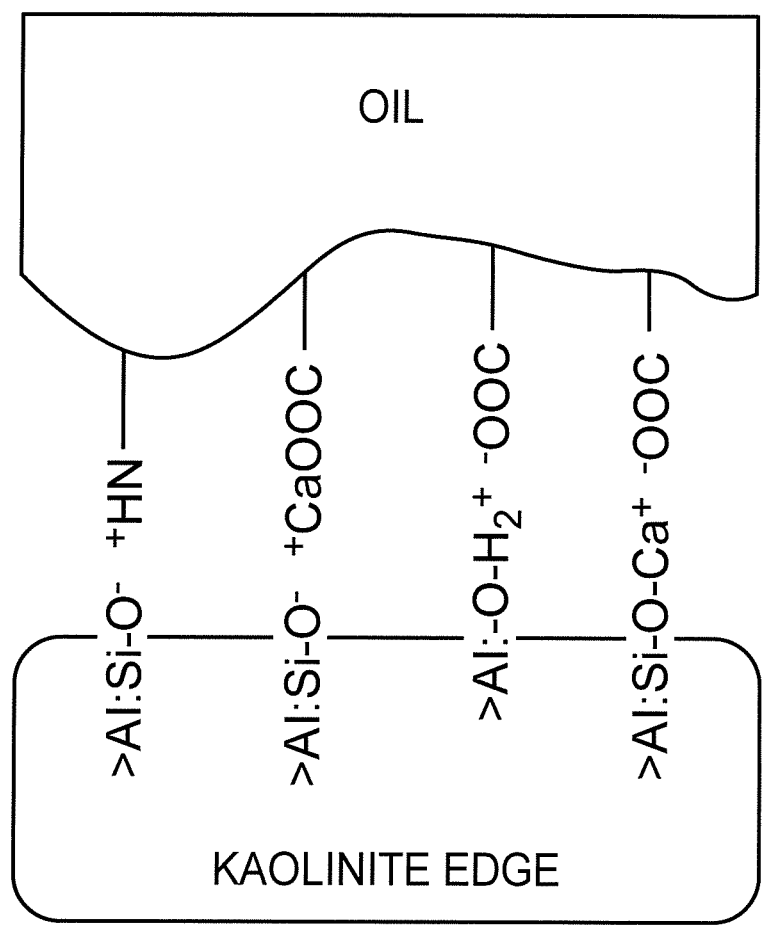
FIG. 12 illustrates four different examples of electrostatic bridges between kaolinite edges and oil.

FIG. 12 illustrates four different examples of electrostatic bridges between kaolinite edges and oil. The rightmost electrostatic bridge between carboxylate (—COO$^-$) and [>Al:Si—O—Ca+] becomes more significant at pH>8.

Figure 13:
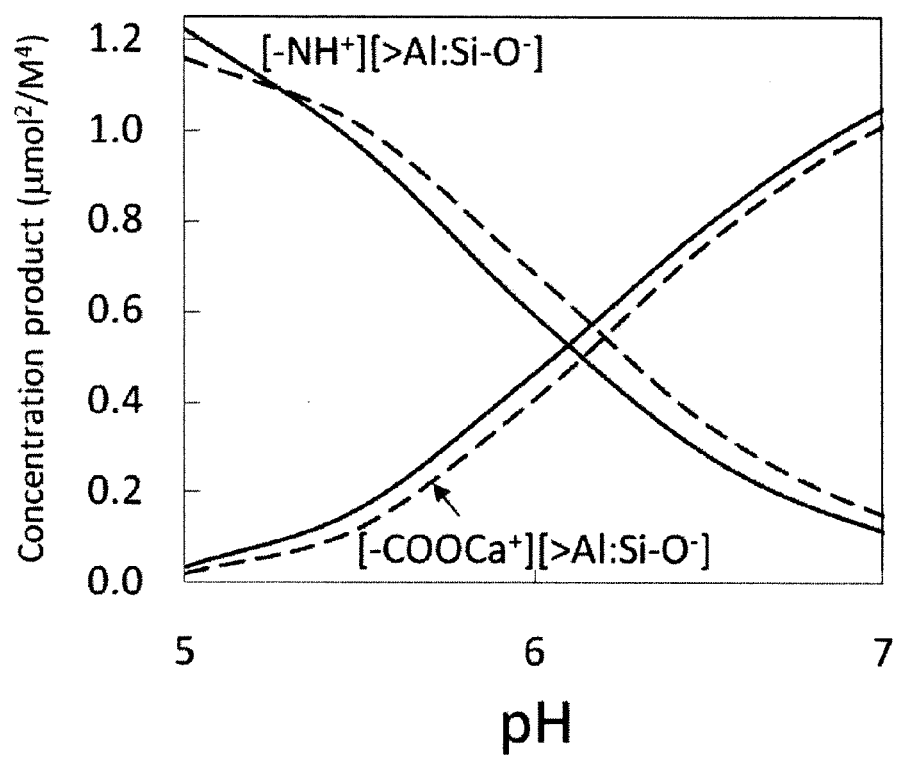
FIG. 13 is a plot illustrating the computed impact of low salinity injection on kaolinite-oil electrostatic bridges as a function of pH.

FIG. 13 is a plot illustrating the calculated impact of low salinity injection on kaolinite-oil electrostatic bridges at 100° C. as a function of pH. In the illustration, the solid lines denote an initial condition of a connate fluid having higher salinity conditions of 0.4 M NaCl and 5 mmol/L Ca$^{2+}$. The dashed lines denote a subsequent condition after mixing injectate with the connate in a 50:50 mixture. The injectate had a relatively lower salinity of 0.02 M NaCl and 0.1 mmol/L Ca$^{2+}$. These calculations were performed using PHREEQC to initially equilibrate the connate with the kaolinite edges and oil, then mix the resulting fluid with the injectate (in this case in a 50:50 mixture), and then re-equilibrate the resulting mixture of the connate and the injectate with the kaolinite edges and the oil interface.

This plot shows that low salinity injectate decreases electrostatic attraction between oil and kaolinite edges and increases waterflood oil recoveries, which is consistent with observation, particularly at pH 5. For pH less than about 5.3, low salinity injectate tends to decrease the extent of [—NH$^+$][>Al:Si—O$^-$] and [—COOCa$^+$][>Al:Si—O$^-$] electrostatic bridging. At pH greater than about 5.3, low salinity injection tends to decrease the extent of [—COOCa$^+$][>Al:Si—O$^-$] electrostatic bridging. Knowing the primary electrostatic bridges allows the injectate composition to be designed to decrease the number of bridges and increase oil recovery. An embodiment of the present invention involves adjusting the pH of the injectate to eliminate electrostatic bridges and increase oil movement. The pH of the injectate may be customized to a particular liquid hydrocarbon, connate fluid, and reservoir properties. For example, in the scenario above recovery of oils with high numbers of nitrogen bases will be enhanced by lowering the pH below 5.3 at 100° C. Similarly, raising the pH of the injectate when oils have high numbers of carboxylate groups (and the connate fluid has relatively high levels of calcium cations) will enhance recovery.

The results suggest that low salinity injectate should enhance oil recovery even when few carboxylate sites exist at the oil-water interface by decreasing [>Al:Si—O$^-$][$^+$HN—] bridges. When oil acid numbers are high, Ca$^{2+}$ coordination to carboxylate groups is predicted to be abundant, and the reduction in [>Al:Si—O$^-$][$^+$CaOOC—] attractive sites with low salinity, low Ca waterflooding is expected to enhance oil recovery. The introduction of chemical agents such as EDTA which form strong aqueous complexes with Ca$^{2+}$ may be predicted to enhance oil recovery by eliminating [>Al:Si—O$^-$][$^+$CaOOC—] bridges.

VIII. Example Embodiment of Rock Interface Reaction Representation Component for Carbonate-Type Reservoirs As previously discussed, some subterranean reservoirs are carbonate-type subterranean reservoirs (e.g., the rock formation includes predominantly limestone, calcite, dolomite, mineral carbonates, etc., and combinations thereof). This section describes an example embodiment of a rock interface reaction representation component suitable for such carbonate-type subterranean reservoirs.

The rock interface reaction representation component suitable for the carbonate-type subterranean reservoir may model surface chemistry of the more significant rocks or minerals found in the carbonate-type reservoir (e.g., calcite and dolomite). In one illustrative example embodiment, such a model may include the following reactions:

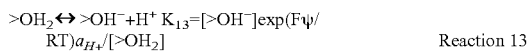
Reaction 13

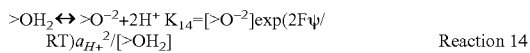
Reaction 14

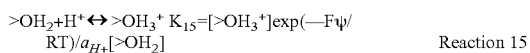
Reaction 15

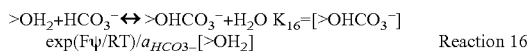
Reaction 16

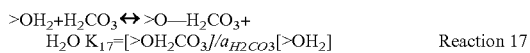
Reaction 17

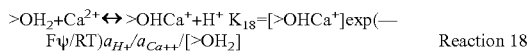
Reaction 18

Further details regarding these reactions, if desired, are published in various articles. See e.g., (1) "Defining reactive sites on hydrated mineral surfaces: Rhombohedral carbonate minerals." Geochem. Cosmochim. Acta. 73: 4326-4345, (2009), by Villegas-Jimenez, A., A. Mucci, et al; (2) "Surface Electrical Properties of Calcite," Journal of Colloid and Interface Science, Vol. 131, No. 1, (1989), by Thompson et al.; and (3) "A surface complexation model of the carbonate mineral-aqueous solution interface," Geochimica et Cosmochimica Acta Vol 57, pp. 3505-3518, (1993), by Cappellen et al. An example embodiment of a rock interface reaction representation component may use these reactions to compute the concentration of charged groups on the reservoir rock surface. Alternative embodiments of components may include fewer, more, or different reactions, as appropriate for the particular implementation.

In some embodiments, an oil interface reaction representation component similar or analogous to those described above may be used to compute the oil interface charged surface species as previously described. If desired, the component may optionally be modified to account for reactions specific to or more prevalent due to the carbonate-type reservoir (e.g., reactions between oil acids and bases and carbonate or bicarbonate ions).

In some embodiments, an oil-rock interface complexation reaction representation component similar or analogous to those described above, although taking into account the different charged species on the reservoir rock as determined by using Reactions 13-18, may be used to evaluate the complexation reactions between charged species associated with the rock interfaces and the oil interfaces. This may be used to calculate the primary electrostatic bridges between the metal carbonate and oil surfaces. If desired, PHREEQC or another reaction evaluation component may optionally be used to take into consideration carbonate-type reservoir rock interface dissolution and precipitation models, etc. Alternatively, dissolution/precipitation factors may optionally be omitted depending upon the implementation. Then, an injectate may be designed as previously described to reduce the extent of such electrostatic bridges and enhance oil recovery from the carbonate-type reservoir.

Various alternate embodiments of injectate design systems are also contemplated. Additional aspects may be added, for example to represent sulfate ($SO_4^{-2}$) reactions, or some of the aspects included in the model may be omitted for simplicity, as appropriate for the particular implementation. While equilibrium reactions have primarily been represented in the above description, other embodiments may incorporate kinetic or rate limiting expressions (e.g., to represent slow desorption affects on oil mobility). Additionally, mass transfer limiting expressions, solid dissolution expressions, and other expressions affecting the rate or extent of reactions may also optionally be included.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other, for example through one or more intervening components. For example a first component may be coupled with a second component by a third intervening component.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known components, equipment, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

Various operations and methods have been described. Some of the methods have been described in a basic form in the flow diagrams, but operations may optionally be added to and/or removed from the methods.

One or more embodiments include an article of manufacture (e.g., a computer program product) that includes a machine-accessible and/or machine-readable medium. The medium may include a mechanism that provides, for example stores, information in a form that is accessible and/or readable by the machine. The machine-accessible and/or machine-readable medium may provide, or have stored thereon, one or more or a sequence of instructions and/or data structures that if executed by a machine causes or results in the machine performing, and/or causes the machine to perform, one or more or a portion of the operations or methods or the techniques shown in the figures disclosed herein.

In embodiments, the machine-readable medium may include a tangible non-transitory machine-readable storage media or device. For example, the tangible non-transitory machine-readable storage media may include a floppy diskette, an optical storage medium, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, or a combination thereof. The tangible medium may include one or more solid or tangible physical materials, such as, for example, a semiconductor material, a phase change material, a magnetic material, an optical solid material, etc.

Examples of suitable machines include, but are not limited to, computer systems, desktops, laptops, servers, workstations, supercomputers, etc. Such electronic devices typically include one or more processors coupled with one or more other components, such as one or more storage devices (non-transitory machine-readable storage media), user input/output devices (e.g., a keyboard, a touchscreen, and/or a display), and/or network connections. The coupling of the processors and other components is typically through one or more busses and bridges (also termed bus controllers). Thus, the storage device of a given electronic device may store code and/or data for execution on the one or more processors of that electronic device. Alternatively, one or more parts of an embodiment of the invention may be implemented using different combinations of software, firmware, and/or hardware.

It should also be appreciated that reference throughout this specification to "one embodiment," "an embodiment," or "one or more embodiments," for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A method of designing an injectate to be used in a waterflooding operation, the method implemented on system hardware, the method comprising:

specifying data representative of chemical characteristics of a liquid hydrocarbon, a connate, and a reservoir rock, of a subterranean reservoir;

determining charged species at an interface of the liquid hydrocarbon based on the specified data by evaluating at least one chemical reaction involving the charged species at the interface of the liquid hydrocarbon;

determining charged species at an interface of the reservoir rock based on the specified data by evaluating at least one chemical reaction involving the charged species at the interface of the reservoir rock;

determining an extent of surface complexation between the charged species at the interfaces of the liquid hydrocarbon and the reservoir rock by evaluating at least one surface complexation reaction; and designing the injectate to be operable to decrease the extent of the surface complexation between the charged species at the interfaces of the liquid hydrocarbon and the reservoir rock;
wherein designing the injectate comprises designing a pH and an ionic strength of the injectate.

2. The method of claim 1, wherein determining the charged species at the interface of the liquid hydrocarbon comprises evaluating:
an acid-base equilibrium chemical reaction for protonation of nitrogen base groups of the liquid hydrocarbon; and
an acid-base equilibrium chemical reaction for deprotonation of carboxyl groups of the liquid hydrocarbon.

3. The method of claim 1, wherein determining the extent of surface complexation comprises evaluating:
a surface complexation reaction between positively charged protonated nitrogen base groups of the liquid hydrocarbon and negatively charged species of the reservoir rock; and
a surface complexation reaction between negatively charged carboxylate groups of the liquid hydrocarbon and positively charged species of the reservoir rock.

4. The method of claim 1, wherein determining the extent of surface complexation comprises evaluating a surface complexation reaction between positively charged calcium and/or magnesium carboxylate groups of the liquid hydrocarbon and negatively charged species of the reservoir rock.

5. The method of claim 1, wherein specifying the physico-chemical data representative of the reservoir rock comprises specifying physico-chemical data representative of a clay.

6. The method of claim 1, wherein specifying the physico-chemical data representative of the reservoir rock comprises specifying physico-chemical data representative of a metal carbonate.

7. The method of claim 1, further comprising generating the injectate according to the determined composition.

8. An injectate design system to be implemented on system hardware, the injectate design system comprising:
a subterranean reservoir representation component to include data representing chemical characteristics of a liquid hydrocarbon, a connate, and a rock of a subterranean reservoir;
an injectate representation component to include data representing chemical characteristics of an injectate;
a chemical reaction representation component to represent:
one or more chemical reactions involving charged species at an interface of the liquid hydrocarbon;
one or more chemical reactions involving charged species at an interface of the rock; and
one or more surface complexation chemical reactions between the charged species at the interfaces of the liquid hydrocarbon and the rock;
a chemical reaction evaluation component in communication with the reservoir and injectate representation components and the chemical reaction representation component, the chemical reaction evaluation component to evaluate the chemical reactions based on the data; and
an injectate design component in communication with the chemical reaction evaluation component, the injectate design component to design an injectate that is operable to reduce an extent of surface complexation between the charged species at the interfaces of the liquid hydrocarbon and the rock;
wherein the injectate design component is to design a pH and an ionic strength of the injectate.

9. The injectate design system of claim 8, wherein the chemical reaction representation component is to represent:
an acid-base equilibrium chemical reaction for protonation of nitrogen base groups of the liquid hydrocarbon; and
an acid-base equilibrium chemical reaction for deprotonation of carboxyl groups of the liquid hydrocarbon.

10. The injectate design system of claim 8, wherein the chemical reaction representation component is to represent:
a surface complexation chemical reaction between positively charged protonated nitrogen base groups of the liquid hydrocarbon and negatively charged species of the reservoir rock; and
a surface complexation chemical reaction between negatively charged carboxylate groups of the liquid hydrocarbon and positively charged species of the reservoir rock.

11. The injectate design system of claim 8, wherein the chemical reaction representation component is to represent a surface complexation reaction between positively charged calcium and/or magnesium carboxylate groups of the liquid hydrocarbon and negatively charged species of the reservoir rock.

12. The injectate design system of claim 8, wherein the subterranean reservoir representation component is to include data representing chemical characteristics of a clay as the rock.

13. The injectate design system of claim 8, wherein the subterranean reservoir representation component is n to include data representing chemical characteristics of a metal carbonate as the rock.

14. The injectate design system of claim 8, further comprising at least one of:
an input device in communication with the reservoir and injectate representation components to receive at least some of the data; and
a presentation device in communication with the chemical reaction evaluation component, the presentation device selected from a display device, a printer, and a network device.

15. An article of manufacture comprising:
a non-transitory tangible machine-readable medium having stored thereon instructions that when executed by a machine are operable to cause the machine to perform operations including:
determining charged species at an interface of a liquid hydrocarbon based on data representative of chemical characteristics of the liquid hydrocarbon and a connate each of a subterranean reservoir by evaluating at least one chemical reaction involving the charged species at the interface of the liquid hydrocarbon;
determining charged species at an interface of a rock based on data representative of chemical characteristics of the rock of the subterranean reservoir by evaluating at least one chemical reaction involving the charged species at the interface of the reservoir rock;
determining an extent of surface complexation between the charged species at the interfaces of the liquid hydrocarbon and the rock by evaluating at least one surface complexation reaction; and
designing an injectate, the designed injectate operable to decrease the extent of the surface complexation between the charged species at the interfaces of the liquid hydrocarbon and the rock;
wherein designing the injectate comprises designing a pH and an ionic strength of the injectate.

16. The article of manufacture of claim 15, wherein the instructions to determine the charged species at the interface of the liquid hydrocarbon further comprise instructions that when executed are operable to cause the machine to evaluate:
- an acid-base equilibrium chemical reaction for protonation of nitrogen base groups of the liquid hydrocarbon; and
- an acid-base equilibrium chemical reaction for deprotonation of carboxyl groups of the liquid hydrocarbon.

17. The article of manufacture of claim 15, wherein the instructions to determine the extent of surface complexation further comprise instructions that when executed are operable to cause the machine to evaluate:
- a surface complexation chemical reaction between positively charged protonated nitrogen base groups of the liquid hydrocarbon and negatively charged species of the reservoir rock; and
- a surface complexation chemical reaction between negatively charged carboxylate groups of the liquid hydrocarbon and positively charged species of the reservoir rock.

18. The article of manufacture of claim 15, wherein the non-transitory machine readable-readable medium is one of a disc and a memory, and wherein the rock comprises a clay of a sandstone subterranean reservoir.

* * * * *